US008736092B2

(12) United States Patent
Ormel (10) Patent No.: US 8,736,092 B2
(45) Date of Patent: May 27, 2014

(54) CONTROL SYSTEM AND A METHOD FOR REDUNDANT CONTROL OF A WIND TURBINE (75) Inventor: Frank Ormel, Kolind (DK)

(73) Assignee: Vestas Wind Systems A/S, Aarhus N (DK)

( * ) Notice: Subject to any disclaimer, the term of this patent is extended or adjusted under 35 U.S.C. 154(b) by 919 days.

(21) Appl. No.: 12/920,859

(22) PCT Filed: Feb. 19, 2009

(86) PCT No.: PCT/EP2009/051968
§ 371 (c)(1),
(2), (4) Date: Nov. 30, 2010

(87) PCT Pub. No.: WO2009/109467
PCT Pub. Date: Sep. 11, 2009

(65) Prior Publication Data
US 2011/0074154 A1  Mar. 31, 2011

Related U.S. Application Data (60) Provisional application No. 61/034,662, filed on Mar. 7, 2008.

(30) Foreign Application Priority Data

Mar. 7, 2008  (DK) ................................. 2008 00342

(51) Int. Cl.
F03D 9/00  (2006.01)
H02P 9/04  (2006.01)
(52) U.S. Cl.
USPC .............................................. 290/44; 290/55
(58) Field of Classification Search
USPC .............. 290/44, 55; 700/287, 290, 286, 288
See application file for complete search history.

(56) References Cited

U.S. PATENT DOCUMENTS 4,400,659 A  8/1983  Barron et al.
7,880,320 B2 *  2/2011  Cook ............................ 290/44
(Continued)

FOREIGN PATENT DOCUMENTS

CA  2 616 502  2/2007
CA  2616502  2/2007
(Continued)

OTHER PUBLICATIONS

Danish Wind Association, Guided Tour, The Electric Wind Turbine Controller, Sep. 19, 2003.
(Continued)

Primary Examiner — Julio Gonzalez
(74) Attorney, Agent, or Firm — Patterson & Sheridan, LLP (57) ABSTRACT A control system and a method for controlling operation of a wind turbine are disclosed. A first sensor and a second sensor are arranged for sampling or continuously measuring a first physical value and a second physical value being representative of a first physical impact and a second physical impact on components of the wind turbine in order to provide a first and a second control parameter for controlling operation of the wind turbine. The first and second control parameters are distinct. During active generation of energy the control system is adapted to selectively switch between controlling the operation of the wind turbine either on the basis of the first control parameter or on the basis of the second control parameter, i.e. to selectively switch between two different, distinct and independent control strategies. The two control strategies allow redundancy in control of the operation of the wind turbine. Both control strategies are based on measurements of actual physical impacts affecting the components of the wind turbine, thereby making it possible to control the wind turbine in a more optimal manner than when using prior art control systems and methods, regardless of which control strategy is selected.

13 Claims, 5 Drawing Sheets (56) References Cited

U.S. PATENT DOCUMENTS

| | | | |
|---|---|---|---|
| 8,380,357 B2 * | 2/2013 | Garcia Barace et al. | 700/287 |
| 8,487,460 B2 * | 7/2013 | Krueger | 290/44 |
| 2005/0276696 A1 | 12/2005 | LeMieux | |
| 2006/0033338 A1 | 2/2006 | Wilson | |
| 2006/0133933 A1 * | 6/2006 | Wobben | 416/61 |
| 2006/0214428 A1 | 9/2006 | Altemark et al. | |
| 2007/0182162 A1 * | 8/2007 | McClintic | 290/55 |
| 2008/0084068 A1 * | 4/2008 | Shibata et al. | 290/44 |
| 2008/0112807 A1 * | 5/2008 | Uphues et al. | 416/1 |

FOREIGN PATENT DOCUMENTS

| | | | |
|---|---|---|---|
| DE | 19928048 A1 * | 12/1999 | F03D 11/00 |
| EP | 0 743 577 A1 | 11/1996 | |
| EP | 0743577 | 11/1996 | |
| EP | 0 913 746 A2 | 5/1999 | |
| EP | 0913746 | 5/1999 | |
| EP | 1 906 192 A2 | 4/2008 | |
| EP | 1906192 | 4/2008 | |
| EP | 2 088 314 A2 | 8/2009 | |
| EP | 2088314 | 8/2009 | |
| GB | 2 023 237 A | 12/1979 | |
| GB | 2023237 | 12/1979 | |
| GB | 2 067 247 A | 7/1981 | |
| GB | 2067247 | 7/1981 | |
| JP | 2006 299818 | 11/1906 | |
| JP | 2006 299818 | 11/2006 | |
| WO | WO 01/66940 A1 | 9/2001 | |
| WO | WO 2005/088121 A2 | 9/2005 | |
| WO | WO 2005/111414 | 11/2005 | |
| WO | WO 2005/111414 A1 | 11/2005 | |
| WO | WO 2006/069573 | 7/2006 | |
| WO | WO 2006/069573 A1 | 7/2006 | |
| WO | WO 2007/010322 A1 | 1/2007 | |
| WO | WO 2007/089136 | 8/2007 | |
| WO | WO 2007/089136 A3 | 8/2007 | |

OTHER PUBLICATIONS

International Preliminary Report dated Sep. 7, 2010.

* cited by examiner

CONTROL SYSTEM AND A METHOD FOR REDUNDANT CONTROL OF A WIND TURBINE

PRIORITY CLAIM

This is a U.S. national stage of application No. PCT/EP2009/051968, filed on Feb. 19, 2009. Priority is claimed on the following applications: Denmark Application No.: PA 2008 00342 Filed on Mar. 7, 2008 and U.S. Application No. 61/034,662 Filed on Mar. 7, 2008, the contents of which are incorporated here by reference.

FIELD OF THE INVENTION

The present invention relates to a control system and a method for controlling operation of a wind turbine. More particularly, the control system according to the invention allows redundant control strategies to be used when controlling the wind turbine. Thereby the wind turbine can be controlled optimally, or nearly optimally, for a prolonged operational time. The present invention furthermore relates to a wind turbine having a control system as defined above.

BACKGROUND OF THE INVENTION

Wind turbines are normally controlled in accordance with a control strategy based on one or more measured control parameters, such as wind speed, wind direction, etc. Accordingly, a control system used for controlling operation of a wind turbine is normally connected to one or more sensors, each sensor being arranged to measure a specific control parameter.

In most cases the control parameters are measured by means of separate sensors measuring quantities which do not have a direct impact on the components of the wind turbine. For instance, wind speed is often measured by means of a wind speed sensor, such as a cup anemometer or an ultrasonic wind sensor, positioned on top of the nacelle of the wind turbine or at a separate position in the vicinity of the wind turbine. Such a wind speed sensor measures the wind speed in a single point, and therefore such a measurement is not necessarily representative of the wind speed occurring in the wind field of the entire rotational plane of the rotor blades of the wind turbine. Furthermore, in the case that the wind speed sensor is arranged on top of the nacelle, the measured value of the wind speed may be influenced by disturbances in the wind field caused by the rotor blades. Accordingly, relying on such measured values of the wind speed when controlling the operation of the wind turbine introduces a certain level of unreliability, thereby making it difficult, or even impossible, to control the wind turbine optimally.

It is therefore desirable to be able to control the wind turbine based on control parameters obtained in a more reliable manner.

It is sometimes difficult or impossible to obtain reliable values of a preferred control parameter. This may, e.g., be because the sensor used for measuring the control parameter is out of order, or because the operating conditions are such that the sensor does not operate reliably, e.g. due to fog, heavy rain or snow, ice formation, etc. In this case it is desirable to be able to control the operation of the wind turbine in accordance with a control strategy based on another control parameter which can be measured in a reliable manner.

GB 2 067 247 discloses a wind turbine having pressure probes mounted at the surface of the rotor blades for ascertaining the wind energy in the rotor plane. The indications from the pressure probes are used during normal operation of the wind turbine. An anemometer is placed on top of the nacelle for measuring wind speed on top of the nacelle. The anemometer is used for control of the wind turbine outside the operating range of the turbine, when the turbine is on standstill due to absence of wind or in case of a storm. However, the anemometer suffers from the drawbacks described above, i.e. it only measures the wind speed in one point and the measurement may be disturbed by the rotating rotor blades. Accordingly, measured values from the anemometer can not be used for controlling the wind turbine in accordance with a control strategy requiring precise information regarding physical impact on the wind turbine.

WO 2006/069573 discloses a wind turbine comprising equipment under control. The wind turbine comprises at least one control system for one or more of the main components of the wind turbine. The control system is multiplied by at least one further control system for controlling the same of said equipment under control. It is possible to switch between using the first and the second control system, and redundancy is thereby obtained. However, the control systems monitor same the control parameter(s), and the applied control strategy is therefore not changed when a switch from one control system to another is performed, i.e. the operation of the wind turbine is controlled on the basis of a given control parameter, regardless of which of the control systems is used.

DESCRIPTION OF THE INVENTION

It is an object of the invention to provide a control system for controlling operation of a wind turbine, the control system providing redundant control strategies based on actual impacts on components of the wind turbine.

It is a further object of the invention to provide a control system for controlling operation of a wind turbine, the control system allowing the energy production from the wind turbine to be optimised for a prolonged operational time as compared to known control systems.

It is an even further object of the invention to provide a wind turbine which can be controlled in such a manner that the energy production from the wind turbine can be optimised for a prolonged operational time as compared to known wind turbines.

It is an even further object of the invention to provide a method of controlling operation of a wind turbine, the method allowing the energy production from the wind turbine to be optimised for a prolonged operational time as compared to known control methods.

According to a first aspect of the invention the above and other objects are fulfilled by providing a control system for controlling operation of a wind turbine, the control system comprising:
  a first sensor arranged for sampling or continuously measuring a first physical value being representative of a first physical impact on a component of the wind turbine in order to provide a first control parameter for controlling operation of the wind turbine,
  a second sensor arranged for sampling or continuously measuring a second physical value being representative of a second physical impact on a component of the wind turbine in order to provide a second control parameter for controlling operation of the wind turbine, said second control parameter being distinct from the first control parameter,
wherein the control system during active generation of energy is adapted to selectively switch between controlling the operation of the wind turbine either on the basis of the first control parameter or on the basis of the second control parameter.

The control system comprises a first sensor arranged for sampling or continuously measuring a first physical value, and a second sensor arranged for sampling or continuously measuring a second physical value. In the present context the term 'sampling' should be interpreted to mean measuring the physical value at discrete time intervals. The term 'continuously measuring' should be interpreted to mean monitoring the physical value, thereby obtaining continuous measurements of the physical value. Thus, the first physical value and the second physical value are each measured by means of the first/second sensor to obtain discrete or continuous measurements of the first/second physical value.

The first physical value is representative of a first physical impact on a component of the wind turbine. The component may be a tower construction or a part of a tower construction, one or more rotor blades, a gear arrangement, one or more rotating axes, a generator, a nacelle, a yawing arrangement or part of a yawing arrangement, and/or any other suitable component forming part of the wind turbine. In the present context the term 'physical impact' should be interpreted to mean something, e.g. a force, which physically affects the component in response to the wind acting on the wind turbine. This is in contrast to measuring parameters which do not directly affect the component, e.g. measuring the wind speed in a specific point near the wind turbine by means of an anemometer or an ultrasonic wind sensor, or measuring the wind direction by means of a wind vane or an ultrasonic wind sensor. Thus, the first physical value reflects actual impacts as experienced by a relevant component of the wind turbine, and it is thereby representative for what is really taking place in the wind turbine during operation.

Similarly, the second physical value is representative of a second physical impact on a component of the wind turbine. It should be noted that the component affected by the second physical impact is not necessarily the same as the component affected by the first physical impact, even though this is not ruled out. However, the second physical value differs from the first physical value, and preferably the second physical impact differs from the first physical impact, in the sense that the second physical value is not of the same nature as the first physical value.

Based on the first physical value a first control parameter is obtained, and based on the second physical value a second control parameter is obtained, said second control parameter being distinct from the first control parameter. Thus, the second control parameter differs from the first control parameter in the sense that the control parameters may be used for controlling the operation of the wind turbine according to two different and independent control strategies. The control parameters may simply be the measured physical values. Alternatively, the control parameters may be derived from the measured physical values, e.g. by means of calculations or using empirically obtained look-up tables.

Thus, the measurements by the first sensor provide a basis for a first control strategy, and the measurements by the second sensor provide a basis for a second control strategy, and both control strategies are based on actual physical impacts on the wind turbine, i.e. in both cases the operation of the wind turbine is controlled on the basis of what is actually happening in the wind turbine. As a consequence, the operation of the wind turbine can be controlled to obtain an optimal energy production, regardless of which of the two control strategies is chosen. Thereby the two control strategies can be regarded as redundant control strategies, allowing optimal energy production of the wind turbine to be obtained for a prolonged operational time.

The control system is adapted to selectively switch between controlling the operation of the wind turbine either on the basis of the first control parameter or on the basis of the second control parameter. This can be done during active generation of energy, i.e. during normal operation of the wind turbine. Thus, even while the wind turbine is operating, it is possible to select the control strategy which is best suited under the given circumstances. This is very advantageous.

Controlling the operation of the wind turbine on the basis of the first control parameter and controlling the operation of the wind turbine on the basis of the second control parameter may advantageously represent two different and independent control strategies. Thus, selectively switching between controlling the operation of the wind turbine on the basis of the first control parameter and controlling the operation of the wind turbine on the basis of the second control parameter, corresponds to selectively switching between two different, distinct and independent control strategies.

The control system may further comprise means for determining validity of the first physical value obtained by the first sensor, and/or means for determining validity of the second physical value obtained by the second sensor. According to this embodiment the control system is capable of determining whether or not, and to what extent, a given measured physical value is valid. The validity of a physical value provides an important basis for evaluating the reliability of measurements performed by the corresponding sensor. It may, e.g., be envisaged that certain conditions, e.g. certain weather conditions, render measurements by one of the sensors unreliable, without affecting measurements performed by the other sensor. It may also be envisaged that one of the sensors is out of order or broken. In such cases a control strategy based on the control parameter obtained on the basis of physical values measured by the unaffected sensor may advantageously be selected. In the case that it is determined that the physical values obtained by both of the sensors are valid, one of the control strategies is selected according to other criteria. Finally, in the case that it is determined that the physical values obtained by both of the sensors are invalid/unreliable, a third control strategy may be selected, or the wind turbine may be stopped until valid/reliable physical values can again be obtained from at least one of the sensors.

Thus, the control system may be adapted to selectively switch between controlling the operation of the wind turbine based on the first control parameter and controlling the operation of the wind turbine based on the second control parameter, on the basis of determined validity of the first physical value and/or the second physical value.

The first physical value or the second physical value may be a torque induced in a main shaft of the wind turbine. According to this embodiment the first/second physical impact is the rotation of the main shaft in response to the wind acting on the rotor blades of the wind turbine, and the first/second control parameter may advantageously be the rotational speed of the main shaft. The torque induced in the main shaft depends on the wind field throughout the entire plane swept by the rotor blades of the wind turbine, and it is therefore a much more precise measure for the wind speed experienced by or impacting on the wind turbine than a measured wind speed in a single point at or near the wind turbine. Thus, controlling the operation of the wind turbine based on such measurements ensures that the wind turbine can be controlled in an optimal manner and in precise accordance with the actual conditions.

Alternatively or additionally, the first physical value or the second physical value may be an energy rate produced by the wind turbine. The energy rate produced by the wind turbine also depends on the wind speed/wind field across the entire plane swept by the rotor blades. It also depends on the pitching angle of the rotor blades, in the case that the wind turbine is a pitch controlled wind turbine. A measured energy rate may be used as a control parameter for controlling the pitch angle of the rotor blades in order to obtain an optimal energy production.

Alternatively or additionally, the first physical value or the second physical value may be a deflection of at least one rotor blade of the wind turbine. The deflection of the rotor blades is a result of the wind pressure applied to the blades across the plane swept by the rotor blades. This wind pressure depends on the wind speed/wind field, the wind direction, the yawing angle of the nacelle and the pitch angle of the rotor blades. Accordingly, one or more of these parameters may be derived from a measurement of the deflection of one or more rotor blades, possibly in combination with information about some or all of the other parameters, e.g. obtained from other measurements, and possibly using look-up tables. The deflection of the rotor blade is preferably along a direction which is substantially transverse to the rotor plane, i.e. substantially transverse to a longitudinal axis of the blade and substantially transverse to a direction of movement of the blade during operation of the wind turbine.

Alternatively or additionally, the first physical value or the second physical value may be a strain induced in a rotor blade. Such a strain may be a result of a deflection of the rotor blade as described above. The strain may advantageously be measured by means of an electrical or optical strain gauge arranged on or in the rotor blade.

Alternatively or additionally, the first physical value or the second physical value may be a deflected position of a tip portion of a rotor blade. According to this embodiment a relevant sensor may advantageously be arranged at or near the tip of the rotor blade. The sensor may, e.g., be a strain gauge, a deflection sensor, a global positioning system (GPS) sensor or any other suitable sensor being adapted to measure a precise position of the tip of the rotor blade. As described above, the deflected position of the tip of the rotor blade provides an indication of the wind pressure acting on the rotor blades across the entire plane swept by the rotor blades.

Alternatively or additionally, the first physical value or the second physical value may be a pressure detected at a surface of a rotor blade. Preferably, the rotor blade is provided with at least two pressure sensors arranged on opposite sides of a centre plane of the rotor blade. Thereby a pressure difference between the opposite sides of the centre plane can be detected. This pressure difference depends on the yawing position of the nacelle, the pitch angle of the rotor blade, the rotary speed of the rotor and the wind speed prevailing across the plane swept by the rotor blades. Accordingly, any of these parameters can be obtained from a measurement of the pressure difference if the remaining parameters are known. The obtained parameter may advantageously be used as a control parameter.

Alternatively or additionally, the first physical value or the second physical value may be a deflection of a wind turbine tower. When the wind pressure acts on the wind turbine, the tower will deflect. The deflection depends on the wind speed acting directly on the tower, the wind speed prevailing in the plane swept by the rotor blades, the wind direction, the yawing angle and the pitch angle of the rotor blades in the case that the wind turbine is a pitch controlled wind turbine. Thus, measurements of the deflection of the wind turbine may, e.g., be used as a basis for controlling yawing position or pitch angle in order to obtain an optimal energy production or in order to limit structural loads on the tower construction to an acceptable level.

Alternatively or additionally, the first physical value or the second physical value may be a force induced in a bearing comprised in a drive train accommodated in the nacelle. Such forces indicate the load on the bearing during operation of the wind turbine, and such loads depend, among other things, on the wind speed and the wind direction relative to the yawing position of the nacelle. A measured force may advantageously be used for controlling the operation of the wind turbine in such a manner that structural loads on the bearing are limited to an acceptable level.

Alternatively or additionally, the first physical value or the second physical value may be a torque induced in an electrical generator. The torque induced in the generator of the wind turbine provides a measure for the energy production of the wind turbine, and it may be used as a basis for controlling operation of the wind turbine in order to obtain an optimal energy production.

All of the examples of physical values given above are representative of an actual physical impact on a component of the wind turbine. In each case the physical impact is a result of the wind acting on the wind turbine, i.e. it reflects the actual situation as the wind turbine 'experiences' it.

The control system of the present invention may advantageously form part of a wind turbine further comprising a tower construction, a nacelle accommodating at least a drive train and a set of rotor blades.

According to a second aspect of the invention the above and other objects are fulfilled by providing a method of controlling a wind turbine, the method comprising the steps of:
  obtaining a first physical value being representative of a first physical impact on a component of the wind turbine,
  providing a first control parameter for controlling operation of the wind turbine, based on the first physical value,
  obtaining a second physical value being representative of a second physical impact on a component of the wind turbine,
  providing a second control parameter for controlling operation of the wind turbine, based on the second physical value, said second control parameter being distinct from the first control parameter,
  during active generation of energy, selecting a control strategy for controlling the operation of the wind turbine either on the basis of the first control parameter or on the basis of the second control parameter, and
  controlling operation of the wind turbine in accordance with the selected control strategy.

It should be noted that a skilled person would readily recognise that any feature described in combination with the first aspect of the invention could also be combined with the second aspect of the invention, and vice versa.

The method according to the second aspect of the invention may advantageously be used for controlling a wind turbine comprising a control system according to the first aspect of the invention.

The method may further comprise the step of determining the validity of the first physical value and/or the validity of the second physical value. In this case the step of selecting a control strategy may advantageously be performed on the basis of said determining step, as described above.

BRIEF DESCRIPTION OF THE DRAWINGS

The invention will now be described in further detail with reference to the accompanying drawings in which.

DETAILED DESCRIPTION OF THE DRAWINGS

Figure 1:
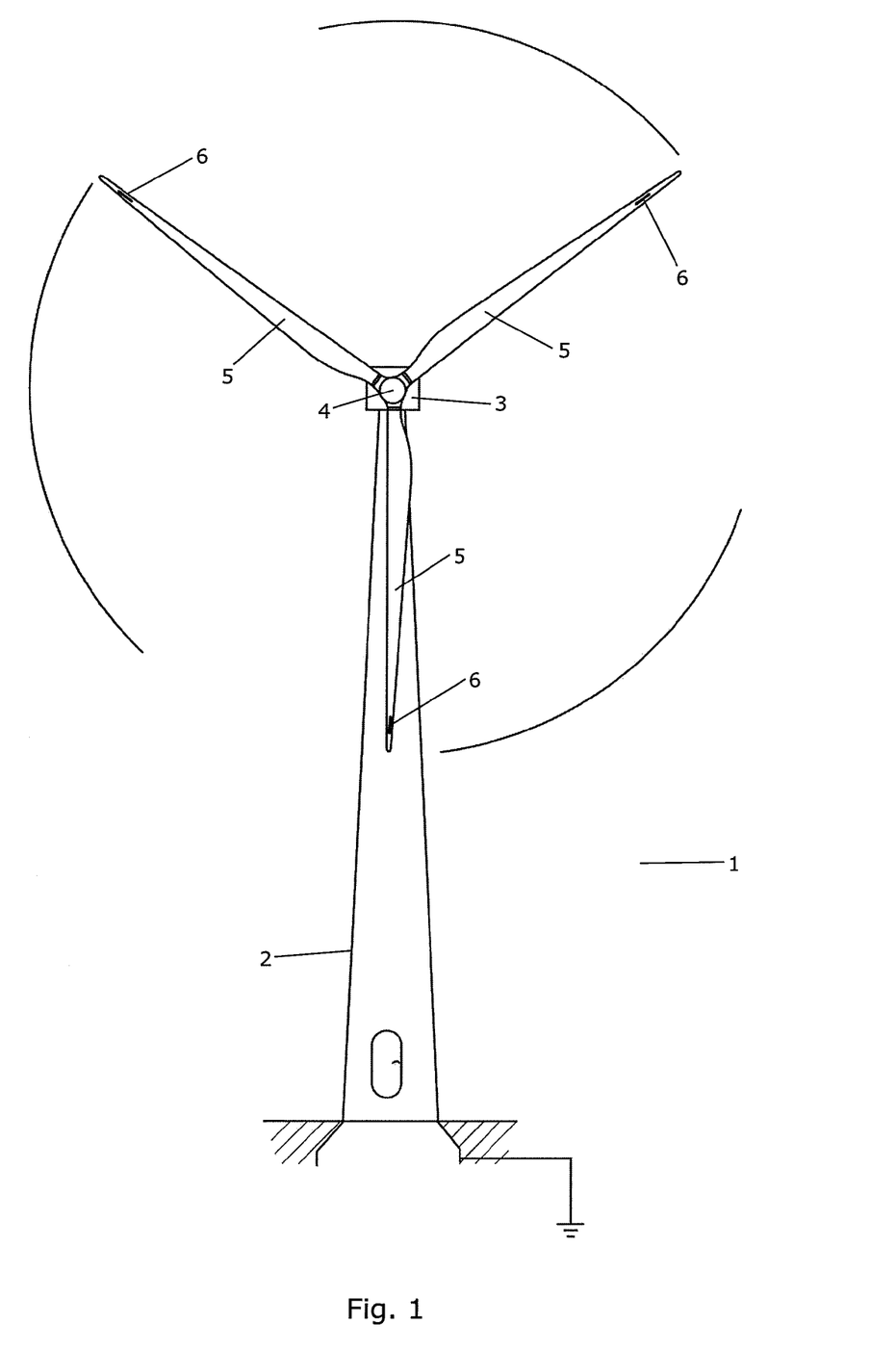
FIG. 1 is a front view of a wind turbine according to a first embodiment of the invention.

FIG. 1 is a front view of a wind turbine 1 according to a first embodiment of the invention. The wind turbine 1 comprises a tower construction 2 and a nacelle 3 with a rotor 4 carrying three rotor blades 5. The rotor blades 5 are arranged in such a manner that they cause rotation of the rotor 4 in response to the wind acting upon the rotor blades 5.

Near the tip of each rotor blade 5 a sensor 6 is mounted. One or more of the sensors 6 may, e.g., be electrical or optical strain gauges for measuring deflection of the rotor blades 5. As an alternative, one or more of the sensors 6 may be GPS devices for measuring the precise position of the tips of the rotor blades 5, e.g. in order to measure deflection of the rotor blades 5 or a yawing position of the nacelle 3. As another alternative, one or more of the sensors 6 may be pressure sensors for measuring a pressure and/or pressure differences at the tip of one or more of the rotor blades 5, e.g. in order to measure wind speed. Alternatively, other suitable sensors 6 may be envisaged, and/or two or more of the sensor types described above may be arranged at the tip of one or more of the rotor blades 5.

Figure 2:
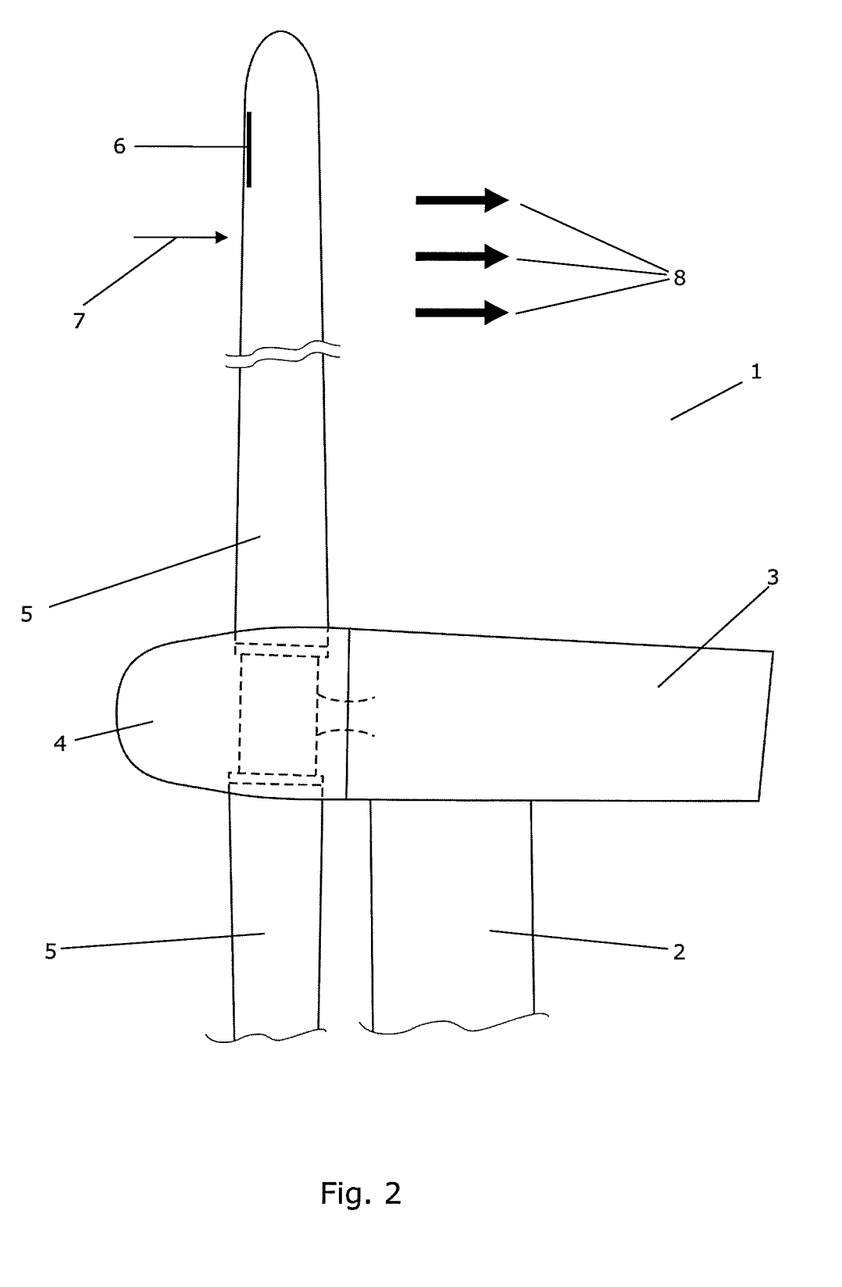
FIG. 2 is a side view of the wind turbine of FIG. 1, illustrating movement of the rotor blade due to the wind pressure.

FIG. 2 is a side view of the wind turbine 1 of FIG. 1, illustrating movement of the rotor blade 5 due to the wind pressure. Two of the rotor blades 5 are visible. For the sake of clarity part of the tower construction 2 and part of the rotor blades 5 have been omitted. The sensor 6 mounted at one of the rotor blades 5 can be seen. The direction of the wind is indicated by arrow 7. The wind causes the rotor blades 5 to deflect in the direction indicated by arrows 8. In the case that the sensor 6 is an electrical or optical strain gauge, this deflection can be measured by the sensor 6.

Figure 3:
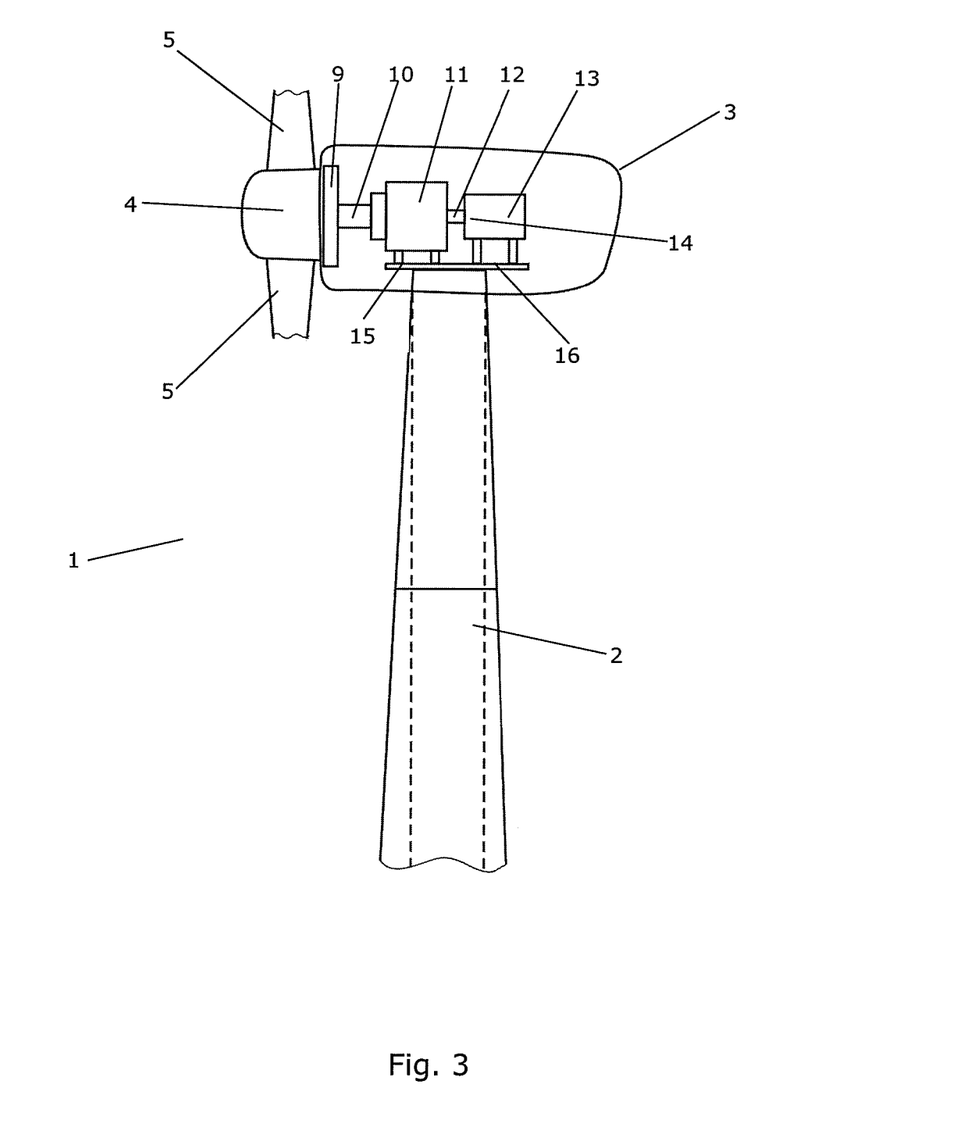
FIG. 3 is a partly transparent side view of a wind turbine according to a second embodiment of the invention.

FIG. 3 is a side view of a wind turbine 1 according to a second embodiment of the invention. For the sake of clarity, part of the tower construction 2 and part of the rotor blades 5 have been omitted. The nacelle 3 is shown transparently in order to show the parts arranged inside the nacelle 3. Inside the nacelle 3 a main bearing 9, a main shaft 10, a gear arrangement 11, a generator shaft 12 and a generator 13 are shown in a schematic manner.

At the generator 13 an rpm sensor 14 is arranged for measuring the rotational speed of the generator shaft 12. The rotational speed of the generator shaft 12 in combination with the generator torque is representative of the energy rate produced by the generator 13.

The gear arrangement 11 and the generator 13 are mounted on a base frame 15 which is rotatably mounted on the top of the tower construction 2 via a yawing arrangement. Near the yawing arrangement a yawing sensor 16 is mounted for measuring the yawing position of the nacelle 3.

Figure 4:
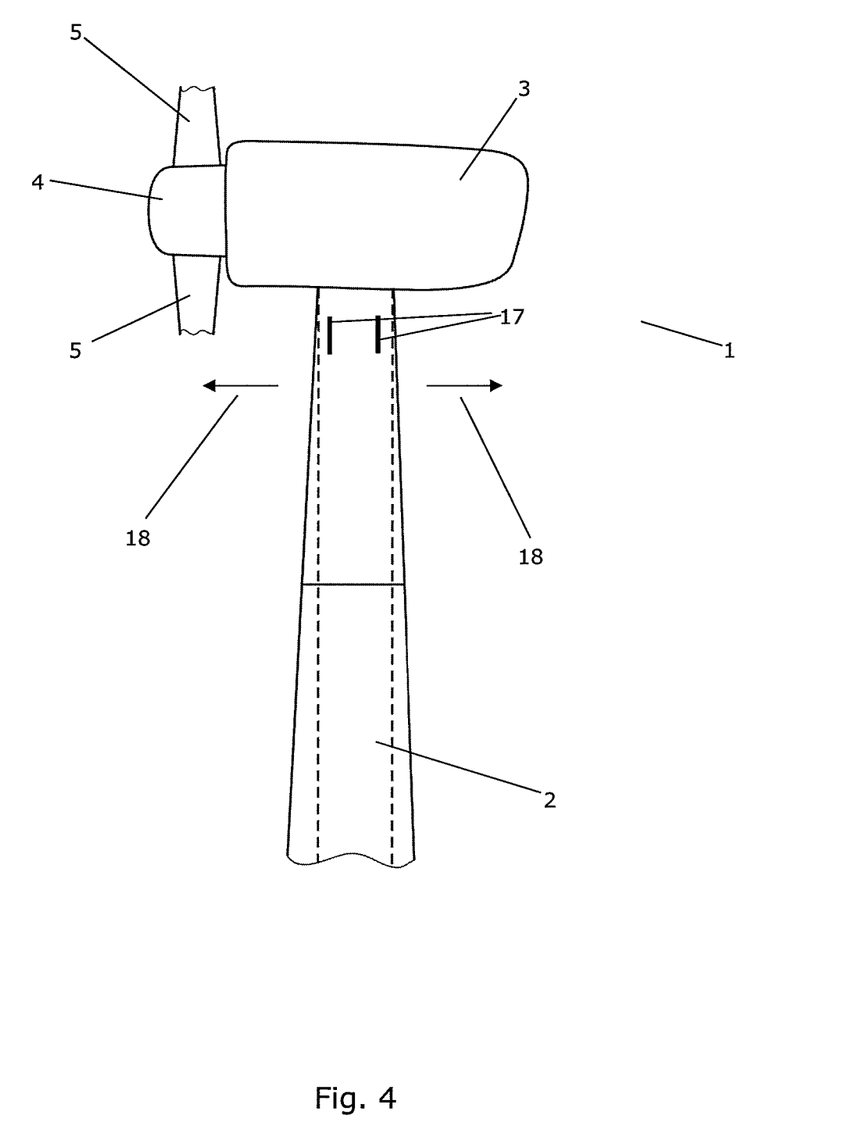
FIG. 4 is a side view of a wind turbine according to a third embodiment of the invention.

FIG. 4 is a side view of a wind turbine 1 according to a third embodiment of the invention. For the sake of clarity, part of the tower construction 2 and part of the rotor blades 5 have been omitted. Near the top of the tower construction 2 a number of deflection sensors 17, two of which are visible, are mounted. The deflection sensors 17 measure the deflection of the tower construction 2, as illustrated by arrows 18, in response to the wind pressure on the wind turbine 1. Preferably, the deflection sensors 17 measure the size as well as the direction of the deflection 18. Thus, the measured deflection 18 is representative of the load induced on the rotor blades by the wind.

Figure 5:
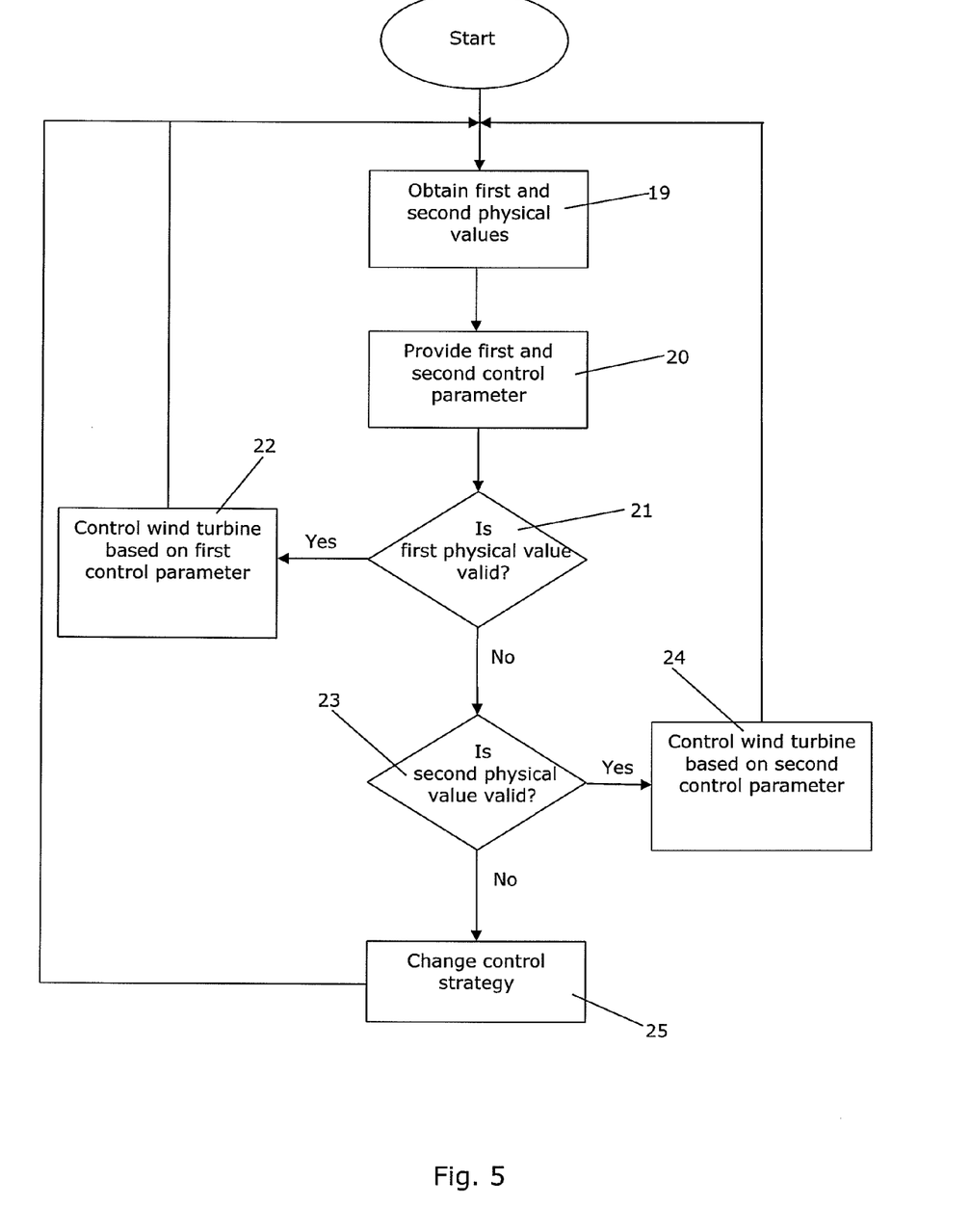
FIG. 5 is a flow diagram illustrating a method of controlling a wind turbine in accordance with an embodiment of the invention.

FIG. 5 is a flow diagram illustrating a method of controlling a wind turbine in accordance with an embodiment of the invention. Initially first and second physical values are obtained at step 19 by means of a first and a second sensor, respectively. Based on the obtained physical values, first and second control parameters are then provided at step 20. Next, at step 21, it is investigated whether or not the first physical value is valid. In the case that it is determined that the first physical value is valid, the wind turbine is controlled in accordance with a control strategy based on the first control parameter, as shown in step 22, and the process is returned to step 18 for continued measurement of the first and second physical values. Thus, according to the method illustrated in FIG. 5, the preferred control strategy is based on the first control parameter. It should be noted that it would be within the scope of the present invention that, as long as the first physical value is valid, only this value is measured, i.e. measuring the second physical value may be dispensed with under these circumstances.

In the case that it is determined that the first physical value is invalid, it is investigated whether or not the second physical value is valid at step 23. In the case that it is determined that the second physical value is valid, the wind turbine is controlled in accordance with a control strategy based on the second control parameter, as shown in step 24, and the process is returned to step 19 for continued measurement of the first and second physical values.

In the case that it is determined that the second physical value is invalid, a change of control strategy is performed as shown in step 25, and the process is returned to step 19 for continued measurement of the first and second physical values. A change of control strategy may include controlling the operation of the wind turbine based on a third control parameter, which is neither the same as the first control parameter, nor the same as the second control parameter. Alternatively, it may include bringing the wind turbine to a standstill. This may, e.g., be necessary in the case that the wind speed is insufficient to operate the wind turbine, or in the case of a storm.

The invention claimed is:

1. A control system for controlling operation of a wind turbine, the control system comprising:
   a first sensor arranged for sampling or continuously measuring a first physical value being representative of a first physical impact on a component of the wind turbine in order to provide a first control parameter for controlling operation of the wind turbine,
   a second sensor arranged for sampling or continuously measuring a second physical value being representative of a second physical impact on a component of the wind turbine in order to provide a second control parameter for controlling operation of the wind turbine, said second control parameter being distinct from the first control parameter,
   wherein, during active generation of energy, upon determining that the first physical value is valid, the control system is adapted to selectively control the operation of the wind turbine based on the first control parameter, and
   wherein, during active generation of energy, upon determining that the first physical value is invalid and the second physical value is valid, the control system is adapted to selectively control the wind turbine based on the second control parameter.

2. The control system according to claim 1, wherein the first physical value comprises a torque induced in a main shaft of the wind turbine.

3. The control system according to claim 1, wherein the first physical value comprises an energy rate produced by the wind turbine.

4. The control system according to claim 1, wherein the first physical value comprises a deflection of at least one rotor blade of the wind turbine.

5. The control system according to claim 1, wherein the first physical value comprises a strain induced in a rotor blade.

6. The control system according to claim 1, wherein the first physical value comprises a deflected position of a tip portion of a rotor blade.

7. The control system according to claim 1, wherein the first physical value comprises a pressure detected at a surface of a rotor blade.

8. The control system according to claim 1, wherein the first physical value comprises a deflection of a wind turbine tower.

9. The control system according to claim 1, wherein the first physical value comprises a force induced in a bearing comprised in a drive train accommodated in the nacelle.

10. The control system according to claim 1, wherein the first physical value comprises a torque induced in an electrical generator.

11. The control system according to claim 1, wherein controlling the operation of the wind turbine on the basis of the first control parameter and controlling the operation of the wind turbine on the basis of the second control parameter represent two different and independent control strategies.

12. A wind turbine comprising a tower construction, a nacelle accommodating at least a drive train, a set of rotor blades and a control system for controlling operation of the wind turbine, the control system comprising:

a first sensor arranged for sampling or continuously measuring a first physical value being representative of a first physical impact on a component of the wind turbine in order to provide a first control parameter for controlling operation of the wind turbine, a second sensor arranged for sampling or continuously measuring a second physical value being representative of a second physical impact on a component of the wind turbine in order to provide a second control parameter for controlling operation of the wind turbine, said second control parameter being distinct from the first control parameter, wherein, during active generation of energy, upon determining that the first physical value is valid, the control system is adapted to selectively control the operation of the wind turbine based on the first control parameter, and wherein, during active generation of energy, upon determining that the first physical value is invalid and the second physical value is valid, the control system is adapted to selective control the operation of the wind turbine based on the second control parameter.

13. A method of controlling a wind turbine, the method comprising the steps of:

obtaining a first physical value being representative of a first physical impact on a component of the wind turbine;

providing a first control parameter for controlling operation of the wind turbine, based on the first physical value;

obtaining a second physical value being representative of a second physical impact on a component of the wind turbine;

providing a second control parameter for controlling operation of the wind turbine, based on the second physical value, said second control parameter being distinct from the first control parameter;

during active generation of energy, upon determining that the first physical value is valid, selecting a control strategy for controlling the operation of the wind turbine based on the first control parameter, and upon determining that the first physical value is invalid and the second physical value is valid, selecting a control strategy for controlling the operation of the wind turbine base on the second control parameter; and controlling operation of the wind turbine in accordance with the selected control strategy.

* * * * *